(12) United States Patent
Hermann et al.

(10) Patent No.: US 10,281,037 B2
(45) Date of Patent: May 7, 2019

(54) DEVICE AND A METHOD FOR DISTRIBUTING TORQUE IN A WORM GEAR ASSEMBLY

(71) Applicant: NIDEC MOTORS & ACTUATORS (GERMANY) GmbH, Bietigheim-Bissingen (DE)

(72) Inventors: Niklas Alexander Hermann, Bad Wildbad (DE); Rainer Bruhn, Ingersheim (DE)

(73) Assignee: NIDEC MOTORS & ACTUATORS (GERMANY) GmbH, Bietigheim-Bissingen (DE)

( * ) Notice: Subject to any disclaimer, the term of this patent is extended or adjusted under 35 U.S.C. 154(b) by 87 days.

(21) Appl. No.: 15/672,321

(22) Filed: Aug. 9, 2017

(65) Prior Publication Data
US 2018/0045308 A1 Feb. 15, 2018

Related U.S. Application Data

(60) Provisional application No. 62/372,325, filed on Aug. 9, 2016.

(51) Int. Cl.
*F16H 61/662* (2006.01)
*F16H 1/16* (2006.01)
(Continued)

(52) U.S. Cl.
CPC ....... *F16H 61/66272* (2013.01); *F16H 1/166* (2013.01); *F16H 1/225* (2013.01);
(Continued)

(58) Field of Classification Search
CPC .... F16H 61/66272; F16H 1/666; F16H 1/225; F16H 3/54; F16H 37/041; F16H 37/0813; F16H 55/22
See application file for complete search history.

(56) References Cited

U.S. PATENT DOCUMENTS 1,603,557 A * 10/1926 Schleier ................. F16H 1/166
74/427
4,989,472 A * 2/1991 James, Sr. ............... F16H 1/225
74/409
(Continued)

FOREIGN PATENT DOCUMENTS

JP 3947803 B2 7/2007
JP 4906622 B2 3/2012
(Continued)

*Primary Examiner* — Mark J Beauchaine
(74) *Attorney, Agent, or Firm* — Viering, Jentschura & Partner MBB

(57) ABSTRACT

A worm gear assembly may include an input shaft having a first and second screw formed axially thereon, a first torque transfer unit comprising a first worm wheel operatively coupled to the first worm screw, a first radial pinion coaxially affixed to the first worm wheel, and a first axial crown wheel operatively coupled to the first radial pinion, and a second torque transfer unit comprising a second worm wheel operatively coupled to the second worm screw, a second radial pinion coaxially affixed to the second worm wheel, and a second axial crown wheel operatively coupled to the second radial pinion, wherein the first radial pinion is in meshed interface with the second radial pinion, and wherein torque differences between the first axial crown wheel and the second axial crown wheel are transmitted at least in part through said meshed interface.

20 Claims, 4 Drawing Sheets

(51) Int. Cl.
  *F16H 1/22*    (2006.01)
  *F16H 3/54*    (2006.01)
  *F16H 37/08*   (2006.01)
  *F16H 55/22*   (2006.01)
  *F16H 37/04*   (2006.01)
  *B60J 7/043*   (2006.01)
  *F16H 48/08*   (2006.01)
  *F16H 55/17*   (2006.01)
  *B60J 7/057*   (2006.01)

(52) U.S. Cl.
  CPC ............ *F16H 3/54* (2013.01); *F16H 37/041* (2013.01); *F16H 37/0813* (2013.01); *F16H 55/22* (2013.01); *B60J 7/043* (2013.01); *B60J 7/0573* (2013.01); *F16H 2048/087* (2013.01); *F16H 2055/173* (2013.01)

(56) References Cited

U.S. PATENT DOCUMENTS

| | | | |
|---|---|---|---|
| 8,141,925 B2 | 3/2012 | Mizuno et al. | |
| 8,294,310 B2 | 10/2012 | Shimoyama et al. | |
| 2016/0215854 A1* | 7/2016 | Chao | ................. F16H 1/225 |

FOREIGN PATENT DOCUMENTS

| | | | |
|---|---|---|---|
| JP | 4963643 B2 | 6/2012 | |
| JP | 2014043895 A | 3/2014 | |

* cited by examiner

DEVICE AND A METHOD FOR DISTRIBUTING TORQUE IN A WORM GEAR ASSEMBLY

CROSS-REFERENCE TO RELATED APPLICATION

This application claims the benefit of U.S. provisional application No. 62/372,325, filed Aug. 9, 2016, the content of it being hereby incorporated by reference in its entirety for all purposes.

TECHNICAL FIELD

Various embodiments generally relate to a worm gear assembly and a method for distributing torque in the worm gear assembly.

BACKGROUND

Gear assemblies typically comprise a drivable gear engaged by a driven gear for transmitting torque. The gear assemblies may be used for changing the speed, torque and direction of a power source based on the configuration of the gearing system. According to the specific outputs such as a torque value, an output direction, a speed and a space limitation, etc., various gearing systems such as a planetary gear, a spur gear, a worm gear and a helical gear, etc. are assembled and manufactured.

Some of the gear assemblies, (e.g., planetary gears or spur gears) have an axial output, coincident with an actuator's shaft axis. They are very noisy, however, because the gear assemblies such as planetary gears or spur gears, have high speed in the matching gears between the drivable gear and the driven gear. In addition, if an axial double output is required, two different planetary gear assemblies are needed. Accordingly, a relatively bigger space is needed for achieving the specific output requests such as axial double output.

Although there are special planetary gearing systems for improving these negative aspects, the gearing system may not satisfy specific output requests. Furthermore, they are relatively high priced and limited in a specific industry such as the automotive industry. More particularly, in applications including the actuation of moving assemblies such as a sunroof, convertible roof or other moving assembly, a quiet, strong, reliable and relatively inexpensive drive solution is required.

SUMMARY

The following examples pertain to aspects of this disclosure:

Example 1 is a worm gear assembly, the worm gear assembly comprising an input shaft having a first and second worm screw formed axially thereon, a first torque transfer unit comprising a first worm wheel operatively coupled to the first worm screw, a first radial pinion coaxially affixed to the first worm wheel, and a first axial crown wheel operatively coupled to the first radial pinion, and a second torque transfer unit comprising a second worm wheel operatively coupled to the second worm screw, a second radial pinion coaxially affixed to the second worm wheel, and a second axial crown wheel operatively coupled to the second radial pinion, wherein the first radial pinion is in meshed interface with the second radial pinion, and wherein torque differences between the first axial crown wheel and the second axial crown wheel are transmitted at least in part through said meshed interface.

In Example 2, the subject matter of Example 1 can optionally include that the first radial pinion has spur gears arranged on a radial periphery thereof, and the first axial crown wheel has crown gears on an axial periphery thereof in mesh with the spur gears of the first radial pinion.

In Example 3, the subject matter of Example 1 can optionally include that the second radial pinion has spur gears arranged on a radial periphery thereof, and the second axial crown wheel has crown gears on an axial periphery thereof in mesh with the spur gears of the second radial pinion.

In Example 4, the subject matter of Example 1 can optionally further include a first output shaft that connects coaxially to the first axial crown wheel, and a second output shaft connects coaxially to the second axial crown wheel.

In Example 5, the subject matter of any one of Examples 1 to 4 can optionally include that the worm gear assembly is configured to have an axial double output.

In Example 6, the subject matter of Example 1 can optionally include that the first and second worm screw on the input shaft comprises two opposed worm tooth systems.

In Example 7, the subject matter of Example 6 can optionally include that the two opposed worm tooth systems allow same rotational direction of the first and second axial crown wheels.

In Example 8, the subject matter of Example 6 can optionally include that the two opposed worm tooth systems neutralize axial forces.

In Example 9, the subject matter of any one of Examples 1 to 4 can optionally include that the worm gear assembly is configured to keep the forces within the worm gearing up to 50% of the required torque.

In Example 10, the subject matter of any one of Examples 1 to 6 can optionally include that the first and second worm screws are fabricated as a one-start worm.

In Example 11, the subject matter of any one of Examples 1 to 6 can optionally include that the input shaft is coaxially connected to a rotary motor.

In Example 12, the subject matter of Example 4 can optionally include that the first and second output shafts are parallel to the input shaft.

In Example 13, the subject matter of Example 11 can optionally include that the first and second output shafts are parallel to the motor axis.

In Example 14, the subject matter of any one of Examples 1 to 4 can optionally include wherein the first worm wheel comprises plastic materials.

In Example 15, the subject matter of any one of Examples 1 to 4 can optionally include that the second worm wheel comprises plastic materials.

In Example 16, the subject matter of any one of Examples 1 to 4 can optionally include that the first radial pinion comprises plastic materials.

In Example 17, the subject matter of any one of Examples 1 to 4 can optionally include that the second radial pinion comprises plastic materials.

In Example 18, the subject matter of any one of Examples 1 to 4 can optionally include that the first worm wheel and the first radial pinion comprises a single part.

In Example 19, the subject matter of any one of Examples 1 to 4 can optionally include that the second worm wheel and the second radial pinion comprises a single part.

In Example 20, the subject matter of any one of Examples 1 to 19 can optionally include that a gear box is configured to include the worm gear assembly.

In Example 21, the subject matter of Example 20 can optionally include that the gear box is relatively small size.

In Example 22, the subject matter of any one of Examples 1 to 9 can optionally include that the worm gear assembly is configured to allow the first and second radial pinions to rotate at relatively high torques.

In Example 23, the subject matter of Example 22 can optionally include that the high torque value is at least 8 Nm.

In Example 24, the subject matter of any one of Examples 1 to 4 can optionally include that the worm gear assembly is configured to achieve a low gear noise.

In Example 25, the subject matter of any one of Examples 1 to 9 can optionally include that the worm gear assembly is configured to achieve high gear strength at the worms by a share of the loading on two gear lines with a high number of teeth to ensure a big tooth overlap.

In Example 26, the subject matter of any one of Examples 1 to 9 can optionally include that the worm gear assembly is configured to achieve high gear strength at the spur gears by a share of the forces in two outputs and by a big module with big teeth.

Example 27 is a worm gear assembly, the worm gear assembly comprising an input shaft having a first and second worm screw formed axially thereon, a first torque transfer unit comprising a first worm wheel operatively coupled to the first worm screw, a first radial pinion having spur gears arranged on a radial periphery thereof, a first axial crown wheel having crown gears on an axial periphery thereof in mesh with the spur gears of the first radial pinion, and a second torque transfer unit comprising a second worm wheel operatively coupled to the second worm screw, a second radial pinion coaxially affixed to the second worm wheel and the second radial pinion having spur gears arranged on a radial periphery thereof, a second axial crown wheel having crown gears on an axial periphery thereof in mesh with the spur gears of the second radial pinion, wherein a first output shaft connects coaxially to the first axial crown wheel, and a second output shaft connects coaxially to the second axial crown wheel, wherein the spur gears of the first radial pinion is in meshed interface with the spur gears of the second radial pinion, and wherein torque difference between the first output shaft and the second output shaft are transmitted at least in part through said meshed interface.

In Example 28, the subject matter of Example 27 can optionally include that the worm gear assembly is configured to have an axial double output.

In Example 29, the subject matter of Example 27 can optionally include that the first and second worm screw on the input shaft comprises two opposed worm tooth systems.

In Example 30, the subject matter of Example 29 can optionally include that the two opposed worm tooth systems allow same rotational direction of the first and second axial crown wheels.

In Example 31, the subject matter of any one of Examples 29 to 30 can optionally include that the two opposed worm tooth systems neutralize axial forces.

In Example 32, the subject matter of any one of Examples 27 to 31 can optionally include that the worm gear assembly is configured to keep the forces within the worm gearing up to 50% of the required torque.

In Example 33, the subject matter of any one of Examples 27 to 32 can optionally include that the first and second worm screws are fabricated as a one-start worm.

In Example 34, the subject matter of Example 27 can optionally include that the input shaft is coaxially connected to a rotary motor.

In Example 35, the subject matter of Example 27 can optionally include that the first and second output shafts are parallel to the input shaft.

In Example 36, the subject matter of Example 34 can optionally include that the first and second output shafts are parallel to the motor axis.

In Example 37, the subject matter of Example 27 can optionally include that the first worm wheel comprises plastic materials.

In Example 38, the subject matter of Example 27 can optionally include that the second worm wheel comprises plastic materials.

In Example 39, the subject matter of Example 27 can optionally include that the first radial pinion comprises plastic materials.

In Example 40, the subject matter of Example 27 can optionally include that the second radial pinion comprises plastic materials.

In Example 41, the subject matter of Example 27 can optionally include that the first worm wheel and the first radial pinion comprises a single part.

In Example 42, the subject matter of Example 27 can optionally include that the second worm wheel and the second radial pinion comprises a single part.

In Example 43, the subject matter of any one of Examples 27 to 42 can optionally include that a gear box is configured to include the worm gear assembly.

In Example 44, the subject matter of Example 43 can optionally include that the gear box is relatively small size.

In Example 45, the subject matter of any one of Examples 27 to 32 can optionally include that the worm gear assembly is configured to allow the first and second radial pinions to rotate at relatively high torques.

In Example 46, the subject matter of Example 45 can optionally include that the high torque is at least 8 Nm.

In Example 47, the subject matter of Example 27 can optionally include that the worm gear assembly is configured to achieve a low gear noise.

In Example 48, the subject matter of any one of Examples 27 to 32 can optionally include that the worm gear assembly is configured to achieve high gear strength at the worms by a share of the loading on two gear lines with a high number of teeth to ensure a big tooth overlap.

In Example 49, the subject matter of any one of Examples 27 to 32 can optionally include that the worm gear assembly is configured to achieve high gear strength at the spur gears by a share of the forces in two outputs and by a big module with big teeth.

Example 50 is a method for distributing torque in a worm gear assembly, the method comprising providing an input shaft with a first and second worm screw formed axially thereon, coupling operatively a first worm wheel to the first worm screw, affixing coaxially a first radial pinion to the first worm wheel, wherein the first radial pinion has spur gears arranged on a radial periphery thereof, meshing a first axial crown wheel with the spur gears of the first radial pinion, wherein the first axial crown wheel has crown gears on an axial periphery thereof, coupling operatively a second worm wheel to the second worm screw, affixing coaxially a second radial pinion to the second worm wheel, wherein the second radial pinion has spur gears arranged on a radial periphery thereof, meshing a second axial crown wheel with the spur gears of the second radial pinion, wherein the second axial crown wheel has crown gears on an axial periphery thereof, and coupling the spur gears of the first radial pinion in meshed interface to the spur gears of the second radial pinion, wherein torque differences between the first axial crown wheel and the second axial crown wheel are transmitted at least in part through said meshed interface.

In Example 51, the subject matter of Example 50 can optionally further comprise connecting coaxially a first output shaft to the first axial crown wheel, and connecting coaxially a second output shaft to the second axial crown wheel.

In Example 52, the subject matter of any one of Examples 50 to 51 can optionally include that the worm gear assembly is configured to have an axial double output.

In Example 53, the subject matter of any one of Examples 50 to 51 can optionally include that the first and second worm screw on the input shaft comprises two opposed worm tooth systems.

In Example 54, the subject matter of Example 53 can optionally include that the two opposed worm tooth systems allow same rotational direction of the first and second axial crown wheels.

In Example 55, the subject matter of Example 53 can optionally include that the two opposed worm tooth systems neutralize axial forces.

In Example 56, the subject matter of any one of Examples 50 to 51 can optionally include that the worm gear assembly is configured to keep the forces within the worm gearing up to 50% of the required torque.

In Example 57, the subject matter of any one of Examples 50 to 53 can optionally include that the first and second worm screws are fabricated as a one-start worm.

In Example 58, the subject matter of any one of Examples 50 to 51 can optionally include that the input shaft is coaxially connected to a rotary motor.

In Example 59, the subject matter of Example 51 can optionally include that the first and second output shafts are parallel to the input shaft.

In Example 60, the subject matter of Example 58 can optionally include that the first and second output shafts are parallel to the motor axis.

In Example 61, the subject matter of any one of Examples 50 to 51 can optionally include that the first worm wheel comprises plastic materials.

In Example 62, the subject matter of any one of Examples 50 to 51 can optionally include that the second worm wheel comprises plastic materials.

In Example 63, the subject matter of any one of Examples 50 to 51 can optionally include that the first radial pinion comprises plastic materials.

In Example 64, the subject matter of any one of Examples 50 to 51 can optionally include that the second radial pinion comprises plastic materials.

In Example 65, the subject matter of any one of Examples 50 to 51 can optionally include that the first worm wheel and the first radial pinion comprises a single part.

In Example 66, the subject matter of any one of Examples 50 to 51 can optionally include that the second worm wheel and the second radial pinion comprises a single part.

In Example 67, the subject matter of any one of Examples 50 to 66 can optionally include that a gear box is configured to include the worm gear assembly.

In Example 68, the subject matter of Example 67 can optionally include that the gear box is relatively small size.

In Example 69, the subject matter of any one of Examples 50 to 56 can optionally include that the worm gear assembly is configured to allow the first and second radial pinions to rotate at relatively high torques.

In Example 70, the subject matter of Example 69 can optionally include that the high torque is at least 8 Nm.

In Example 71, the subject matter of any one of Examples 50 to 51 can optionally include that the worm gear assembly is configured to achieve a low gear noise.

In Example 72, the subject matter of any one of Examples 50 to 56 can optionally include that the worm gear assembly is configured to achieve high gear strength at the worms by a share of the loading on two gear lines with a high number of teeth to ensure a big tooth overlap.

In Example 73, the subject matter of any one of Examples 50 to 56 can optionally include that the worm gear assembly is configured to achieve high gear strength at the spur gears by a share of the forces in two outputs and by a big module with big teeth.

In Example 74, the subject matter of any of Examples 1, 27 and 50, can optionally include that at least one of said worm screws has a lead angle configured to prevent reverse actuation of the worm gear assembly.

In Example 75, the subject matter of claim 74, can optionally include that said at least one of said worm screws has a lead angle of 5 degrees or less.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
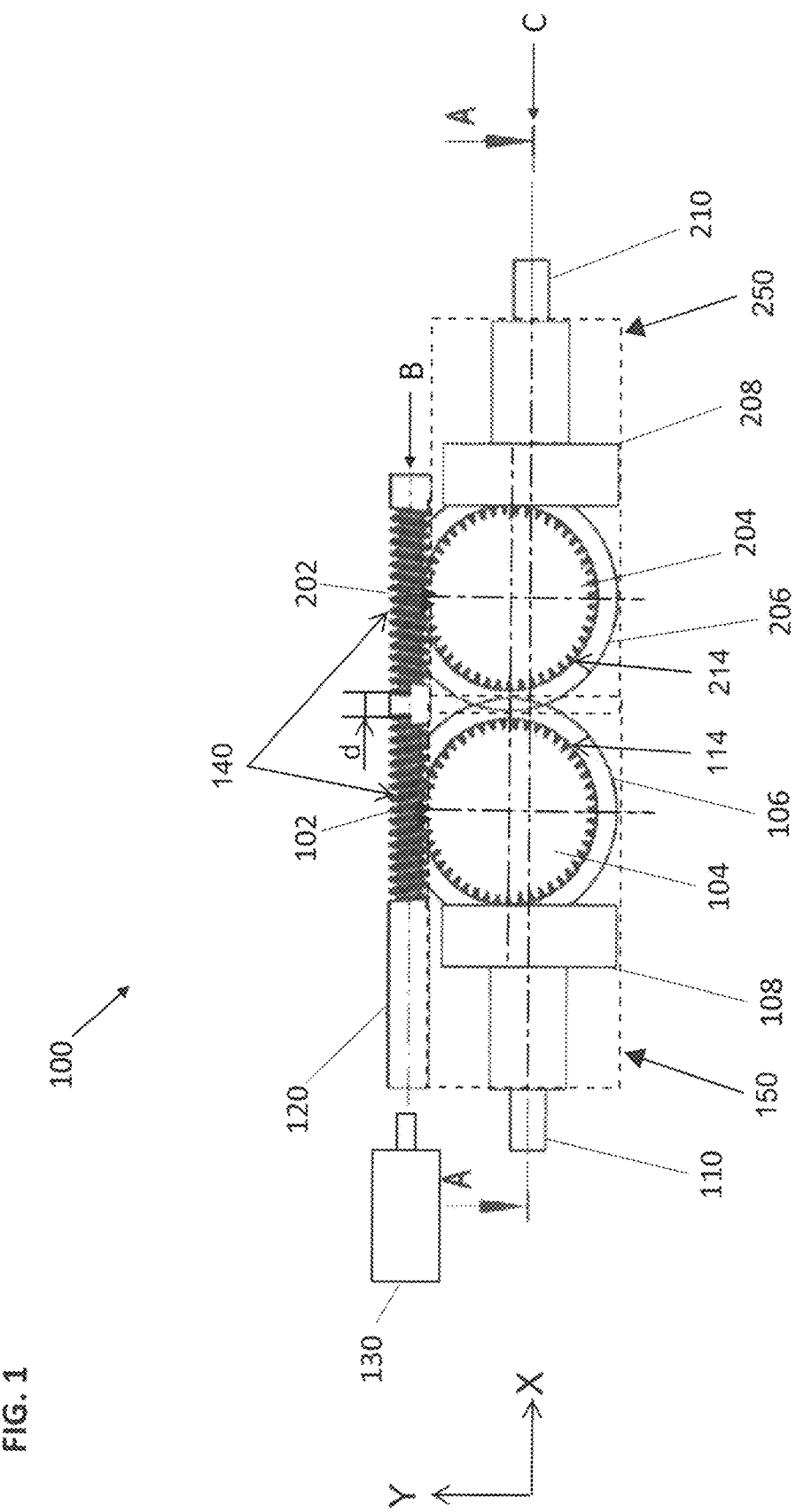
FIG. 1 shows a plan view of a worm gear assembly in engagement in accordance with an aspect of the disclosure.
Figure 2:
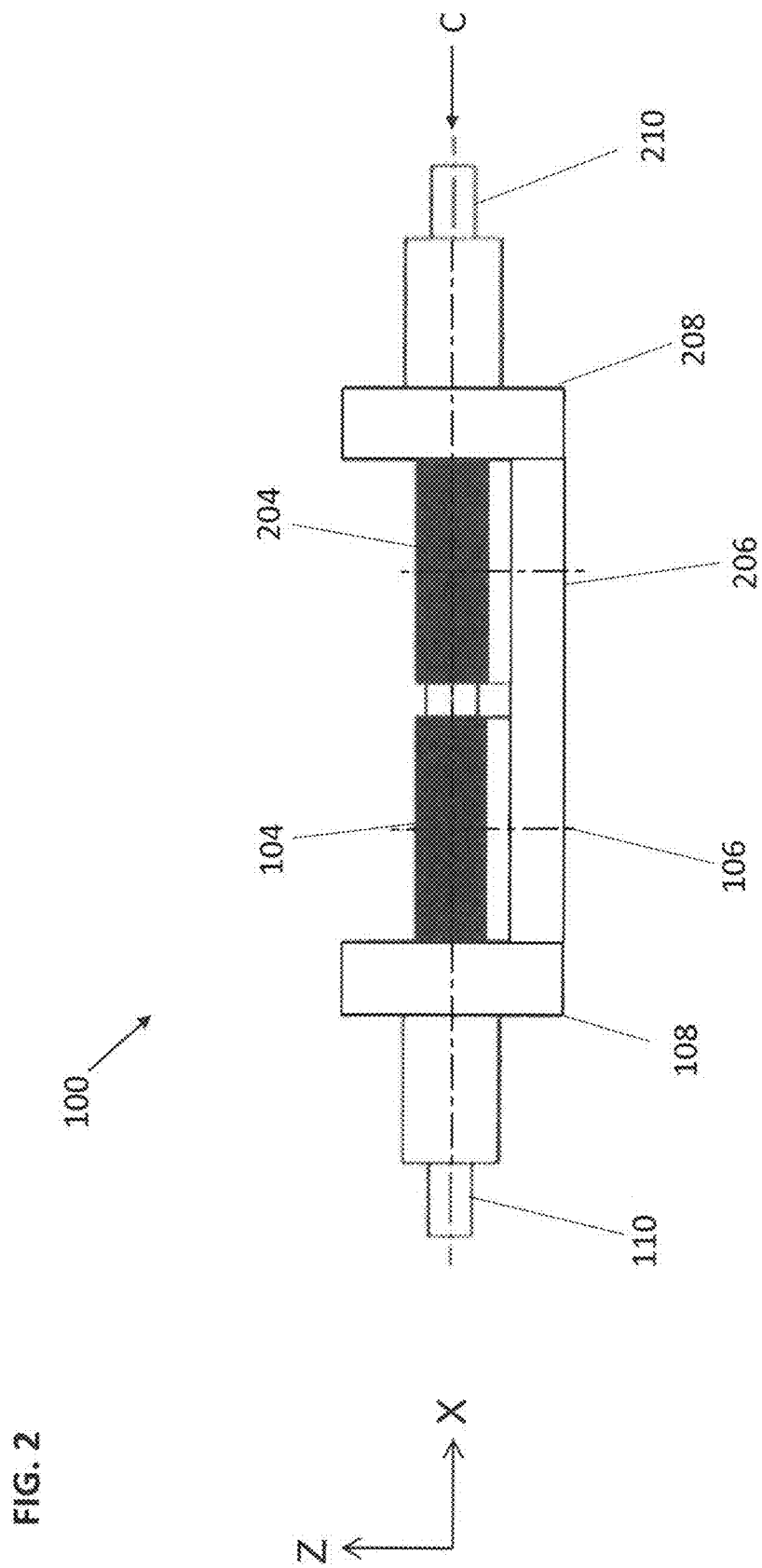
FIG. 2 shows a frontal plane view of the worm gear assembly.
Figure 3:
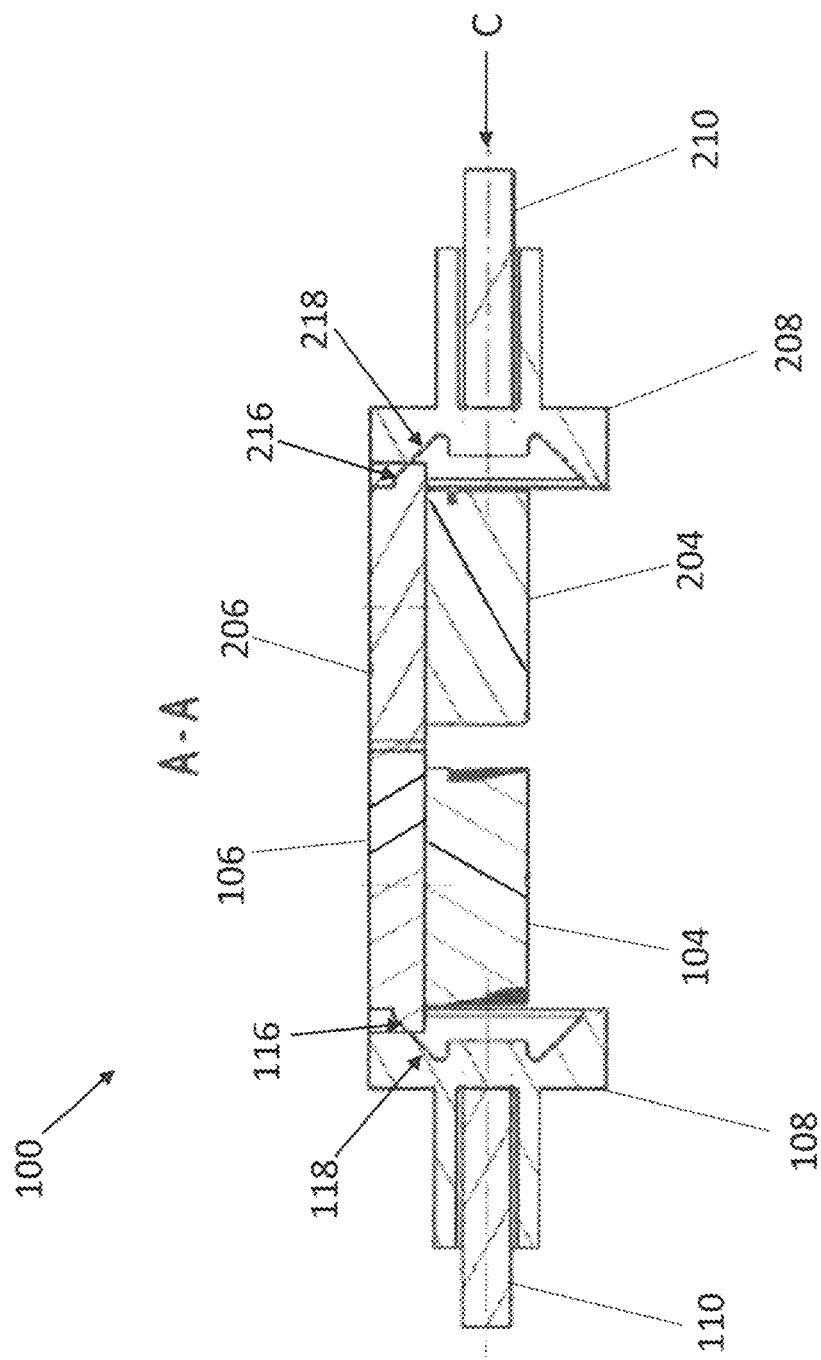
FIG. 3 shows a schematic cross-sectional view taken along a line A-A of FIG. 1.

The following detailed description refers to the accompanying drawings that show, by way of illustration, specific details and embodiments in which the invention may be practiced. FIG. 1 is a plan view illustrating a worm gear assembly 100 in an embodiment of the present disclosure. FIG. 2 is a frontal plan view illustrating worm gear assembly 100 illustrated in FIG. 1. FIG. 3 is a schematic cross-sectional view illustrating a cross section structure of worm gear assembly 100 illustrated in FIG. 1.

As illustrated in FIG. 1 through FIG. 3, worm gear assembly 100 is used for distributing torque. Advantageously, worm gear assembly 100 is a step-down gearing arrangement, in that it reduces speed and increases torque, however other gearings or device ratios are expressly contemplated in the instant disclosure. According to a further advantageous aspect, worm gear assembly 100 may be configured to operate without development of axial force or load at an input shaft 120 due to reactive forces thereon. Worm gear assembly 100 is, according to further advantageous aspects shown configured to operate silently and smoothly. In particular, worm gear assembly 100 of the present invention is described as a double worm gear system, which has two opposed worm tooth systems 140 as shown in FIG. 1. Worm gear assembly 100 is shown with the double worm gear system configured to perform an axial double output with a same rotational direction. This and other configurations in accordance with this disclosure apply the system to various industries including an automotive industry. In particular, worm gear assembly 100 can be applied to some parts of a vehicle such as sunroofs, seat adjustments or trunk lids.

In FIG. 1, worm gear assembly 100 of this embodiment includes an input shaft 120, a first torque transfer unit 150 and a second torque transfer unit 250. As illustrated in FIG. 1, input shaft 120 has two opposed worm tooth systems 140 such as a first worm screw 102 and a second worm screw 202. First worm screw 102 and second worm screw 202 are shown axially formed on input shaft 120.

Input shaft 120 is connected to a power source, such as a source of mechanical power. According to an aspect of the disclosure, the power source can generate a force which can be applied or transferred to the input shaft 120. As exemplary power source is shown as a rotary motor 130 which may be connected, such as by a spline, or by a common axle, with input shaft 120. Accordingly, the input shaft 120 can transfer the force from the power source, to worm gear assembly 100.

As illustrated in FIG. 1, input shaft 120 has first worm screw 102 and second worm screw 202. The first and second worm screws 102, 202 are axially formed on input shaft 120, and are two opposed worm tooth systems 140, that is each screw is threaded in reverse to the other, i.e. with opposite handedness. Furthermore, first and second worm screws 102, 202 are formed on input shaft 120 with a distance d between both worm screws as shown in FIG. 1. Distance d is decided by the shortest gap between a first worm wheel 104 and a second worm wheel 204 in the x-direction (see FIG. 1). First and second worm screws 102, 202 may be one-start worms. However, as understood, multiple-start worms may be advantageous in certain applications depending on the desired gearing because multiple-start worm offers a different gearing ratio to that of a one-start worm.

The one-start worm advantageously has a lead distance equal to its pitch and in turn has a relatively small lead angle. For example, the lead angle may be less than 5 degrees. This can be an advantage when it is desired to eliminate any possibility of the output driving the input. Gearing may be configured such that any torque reversal on the output shaft will cause worm gearing to instantly lock up. The worm gearing is usually used for this purpose, and frequently the worm wheel is driven by one-start worm of such low lead angle that drive cannot be reversed; that is worm wheels 104, 204 cannot drive worm screws 102, 202 as the gearing automatically locks itself against backward rotation. This operational characteristic of worm gear assembly 100 may be desirable in many applications such as sunroofs or seat recliner adjustments in a vehicle, and may be necessary in certain applications for reasons, for example, of passenger safety.

As illustrated in FIG. 1 and FIG. 3, first torque transfer unit 150 includes first worm wheel 104, a first radial pinion 106 and a first axial crown wheel 108. First worm wheel 104 is advantageously operatively coupled to first worm screw 102. As shown, first radial pinion 106 is coaxially affixed, such as by attachment, to first worm wheel 104. That is, they may be affixed coaxially to each other such that they rotate in unison about the same axis. First axial crown wheel 108 is operatively coupled to first radial pinion 106.

In FIG. 1, first worm wheel 104 is shown engaged with first worm screw 102 axially formed on input shaft 120. First worm wheel 104 has a tooth system and the tooth system on the first worm wheel 104 is configured to be operatively coupled to, that is to say in mesh with, the tooth system on first worm screw 102. Accordingly, first worm screw 102 actuates first worm wheel 104 and transfers a rotational force to first worm wheel 104 which has a rotational axis different from that of input shaft 120. In particular, input shaft 120 is shown rotating about an axis in the x-direction whereas first worm wheel 104 is driven by first worm screw 102 about an axis oriented in the z-direction (see FIG. 2). Due at least in part to the afore-mentioned interaction of first worm wheel 104 with first worm screw 102 having a single-start configuration, the gear arrangement with first worm screw 102 and first worm wheel 104 can reduce the rotational speed and transmit higher torque.

First worm wheel 104 can be made of diverse materials such as a plastic or a metal such as steel. According to one aspect of the present disclosure, first worm wheel 104 can be made of plastic material, particularly of a plastic which is robust.

As illustrated in FIG. 1 and FIG. 3, first radial pinion 106 is coaxially affixed to first worm wheel 104. First radial pinion 106 is shown directly attached to, or integrally formed with, first worm wheel 104. Alternately, first radial pinion 106 may be separately attached to first worm wheel 104 by a connecting part such as a splined rod in the center of both wheels. In each case, the result is that both first radial pinion 106 and first worm wheel 104 rotate in unison.

The diameter of first radial pinion 106 is larger than that of first worm wheel 104 as shown in FIG. 1 and FIG. 3. In accordance therewith, a tooth system 116 formed on the periphery of first radial pinion 106 extends radially outward of worm gearing 114 on the periphery of first worm wheel 104.

First radial pinion 106 can be also made of diverse materials such as a plastic or a metal such as steel. According to one aspect of the disclosure, first radial pinion 106 can be made of plastic material, in particular a plastic which is robust. In addition, where first worm wheel 104 and first radial pinion 106 are made of the same material and axially affixed together, both wheels can be made by a single part, formed together as by injection molding.

As illustrated in FIG. 3, first axial crown wheel 108 is operatively coupled to first radial pinion 106. First radial pinion 106 actuates first axial crown wheel 108 in particular, first radial pinion 106 is illustrated in mesh with first axial crown wheel 108. Since first axial crown wheel 108 has a tooth system 118 engaged at an angle with a corresponding tooth system 116 on first radial pinion 106, the rotational output of first radial pinion 106 is changed to a different direction in first axial crown wheel 108. Accordingly, the torque direction in worm gear assembly 100 is changed by the engagement of the tooth systems on both wheels.

In FIG. 3, a further aspect of the disclosure is illustrated. In particular, tooth system 116 on first radial pinion 106 may take the form of spur gears. The spur gears on first radial pinion 106 are arranged on a radial periphery of first radial pinion 106. Also, tooth system 118 on first axial crown wheel 108 may take the form of crown gears. The crown gears on first axial crown wheel 108 are arranged on an axial periphery of first axial crown wheel 108. The crown gears of first axial crown wheel 108 are in mesh with the spur gears of first radial pinion 106. Accordingly, first axial crown wheel 108 is actuated by the engaged gearing system in the axial crown wheel 106 and radial pinion 108 and the torque direction in first axial crown wheel 108 is changed in accordance therewith.

As illustrated in FIG. 1 and FIG. 3, second torque transfer unit 250 is provided having the same or similar parallel configuration to that of first torque transfer unit 150. In particular, second torque transfer unit 250 includes second worm wheel 204, a second radial pinion 206 and a second axial crown wheel 208. Second worm wheel 204 is advantageously operatively coupled to second worm screw 202. As shown, second radial pinion 206 is coaxially affixed, such as by attachment, to second worm wheel 204. That is, they may be affixed coaxially to each other such that they rotate in unison about the same axis. Second axial crown wheel 208 is operatively coupled to second radial pinion 206.

In FIG. 1, second worm wheel 204 is shown engaged with second worm screw 202 axially formed on input shaft 120. Second worm wheel 204 has a tooth system and the tooth system on second worm wheel 204 is configured to be operatively coupled to, that is to say in mesh with, the tooth system on second worm screw 202. Accordingly, second worm screw 202 actuates second worm wheel 204 and transfers a rotational force to second worm wheel 204 which has a rotational axis different from that of input shaft 120. In particular, input shaft 120 is shown rotating about an axis in the x-direction whereas second worm wheel 204 is driven by second worm screw 202 about an axis oriented in the z-direction (see FIG. 2). Due at least in part to the aforementioned interaction of second worm wheel 204 with second worm screw 202 having a single-start configuration, the gear arrangement with second worm screw 202 and second worm wheel 204 can reduce the rotational speed and transmit higher torque.

Second worm wheel 204 can be made of diverse materials such as a plastic or a metal such as steel. According to one aspect of the present disclosure, second worm wheel 204 can be made of plastic material, particularly of a plastic which is robust.

As illustrated in FIG. 1 and FIG. 3, second radial pinion 206 is coaxially affixed to second worm wheel 204. Second radial pinion 206 is shown directly attached to, or integrally formed with, second worm wheel 204. Alternatively, second radial pinion 206 may be separately attached to second worm wheel 204 by a connecting part such as a splined rod in the center of both wheels. In each case, the result is that both second radial pinion 206 and second worm wheel 204 rotate in unison.

The diameter of second radial pinion 206 is larger than that of second worm wheel 204 as shown in FIG. 1 and FIG. 3. In accordance therewith, a tooth system 216 formed on the periphery of second radial pinion 206 extends radially outward of worm gearing 214 on the periphery of second worm wheel 204.

Second radial pinion 206 can be also made of diverse materials such as a plastic or a metal such as steel. According to one aspect of the disclosure, second radial worm wheel 206 can be made of plastic material, in particular a plastic which is robust. In addition, where second worm wheel 204 and second radial pinion 206 can be made of the same material and axially affixed together, both wheels can be made by a single part, formed together as by injection molding.

As illustrated in FIG. 3, second axial crown wheel 208 is operatively coupled to second radial pinion 206. Second radial pinion 206 actuates second axial crown wheel 208, in particular second radial pinion 206 is illustrated in mesh with second axial crown wheel 208. Since second axial crown wheel 208 has a tooth system 218 engaged at an angle with a corresponding tooth system 216 on second radial pinion 206, the rotational output of second radial pinion 206 is changed to a different direction in second axial crown wheel 208. Accordingly, the torque direction in worm gear assembly 100 is changed by the engagement of the tooth systems on both wheels.

In FIG. 3, a further aspect of the disclosure is illustrated. In particular, tooth system 216 on second radial pinion 206 may take the form of spur gears. The spur gears on second radial pinion 206 are arranged on a radial periphery of second radial pinion 206. Also, tooth system 218 on second axial crown wheel 208 may take the form of crown gears. The crown gears on second axial crown wheel 208 are arranged on an axial periphery of second axial crown wheel 208. The crown gears of first axial crown wheel 208 is in mesh with the spur gears of second radial pinion 206. Accordingly, second axial crown wheel 208 is actuated by the engaged gearing system in second axial crown wheel 206 and radial pinion 208 and the torque direction in second axial crown wheel 208 is changed in accordance therewith.

Worm gear assembly 100, as shown in FIG. 1 through FIG. 3, further includes a first output shaft 110 and a second output shaft 210. First output shaft 110 is coaxially connected to first axial crown wheel 108 and second output shaft 210 is coaxially connected to second axial crown wheel 208. Each output shaft 110, 210 may be directly attached to each axial crown wheel 108, 208 or indirectly attached to each axial crown wheel 108, 208 by a connecting part. Where first and second output shafts 110, 210 are coaxially attached to first and second axial crown wheels 108, 208, a rotational speed of each output shaft 110, 210 is kept same as the rotational speed of each axial crown wheel 108, 208. Accordingly, first output shaft 110 and second output shaft 210 do not have to be directly connected each other due to the meshed interface between first radial pinion 106 and second radial pinion 206.

As illustrated in FIG. 1 and FIG. 3, first and second worm screws 102, 202 are engaged with worm gearings 114, 214 on first and second worm wheels 104, 204. As described above, first and second worm screws 102, 202 have two opposed worm tooth systems 140. Accordingly, first and second worm screws 102, 202 are operatively coupled to first and second worm wheels 104, 204. Worm gearings 114, 214 on both worm wheels 104, 204 also have opposed tooth systems according to the opposed threaded direction of each worm screw 102, 202. Due to the opposed tooth systems, both worm wheels 104, 204 with the coaxially affixed radial pinions 106, 206 allow a different turning direction in both worm wheels 104, 204. In result, first and second axial crown wheels 108, 208 can be turned in an axially same direction. Accordingly, worm gear assembly 100 is configured to perform an axial double output with the same direction.

In further, as illustrated in FIG. 3, first radial pinion 106 is in meshed interface with second radial pinion 206. The meshed interface between first radial pinion 106 and second radial pinion 206 is necessary for worm gear assembly 100 to separate the incoming one-sided forces on the input shaft 120. Accordingly, worm gear assembly 100 is configured to require to have the meshed interface between first and second radial pinions 106, 206. In addition, torque differences between first axial crown wheel 108 and second axial crown wheel 208 are transmitted at least in part through the meshed interface. In particular, the transmission of torque may be in either direction, i.e. from first torque transfer unit 150 to second torque transfer unit 250 where load on second output shaft 210 exceeds that on first output shaft 110 or in opposite direction where the load imbalance is reversed. Likewise, where reactive force is considered, the transfer of reactive force between the units would be correspondingly opposite to the transfer of torque discussed immediately above. Therefore, worm gear assembly 100 of the present invention is configured to have the axial double output because two different outputs in each axial crown wheel 108, 208 can be rotated in a same direction. This arrangement allows for the distribution of forces among the components of worm gear assembly 100 in a manner that, among other advantages, reduces the concentration of loads on either one of worm screws 102 or 202 to the exclusion of the other. Thus, having forces divided more evenly among them, worm wheels 104, 204 need not be designed to withstand the same magnitude of forces that would otherwise be necessary to prevent failure of the interface between a worm wheel and the corresponding worm screw. This allows for a less expensive and/or more compact design.

Since opposed tooth systems 140 on first and second worm screws 102, 202 allow a different turning direction in worm gear assembly 100, first and second output shaft 110, 210 attached to first and second axial crown wheel 108, 208 can turn in the same rotational direction. Accordingly, opposed tooth systems 140 neutralize the axial force.

As illustrated in FIG. 1, first and second output shaft 110, 210 on an axis C are parallel to input shaft 120 on an axis B. Furthermore, when input shaft 120 is coaxially connected to one of the power sources such as rotary motor 130, first and second output shaft 110, 210 are also parallel to the motor axis.

According to one aspect of the present disclosure, a gear box is designed to include worm gear assembly 100 in relatively small size. Worm gear assembly 100 is, according to further advantageous aspects shown configured to have relatively high torque and force values, even though the gear box is a small size. In particular, the high torque value may be reached to at max 8 Nm.

According to one aspect of the present disclosure, high gear strength in a worm can be achieved by a share of the loading on two gear lines with a high number of teeth to ensure big teeth overlap in a small given room. In case of a one-side load on input shaft 120, the worm strength is shared by two torque transfer units because first and second worm screws 102, 202 are matching with each worm wheel 104, 204 and with this gear match, the forces are separated to the two worm screws 102, 202. According to a further advantageous aspect, high gear strength at crown wheels is achieved by a sharing of the forces in two outputs and a big module with big teeth.

Advantageously, worm gear assembly 100 is configured to achieve a low gear noise because the first gear stage is a worm drive with low noise. The worm driving gear arrangement reduces speed for the second sensitive crown wheel gears, which would otherwise be noisy if driven at or near speeds of the drive input. According to an aspect of the disclosure, first and second radial pinions 106, 206 including first and second worm wheels 104, 204 run in a low speed in later stages of the gear assembly and thereby possibly reduce the noise significantly. In addition, output shafts 110, 210 are parallel to input shaft 120 in worm gear assembly 100. The characteristic of the configuration of the instant disclosure is much quieter than other parallel configurations of the input and output of a worm gearing system, due to the combination of a worm arrangement operating at the higher speeds of rotation, and the interaction of pinion and crown gearing at the final drive. Accordingly, the present disclosure can advantageously reduce the noise level in a configuration heretofore prone to be noisier than comparable perpendicular arrangements.

Worm gear assembly 100 is configured to have axial double output combined with a worm gear system in a small given space with high forces. The most important part of worm gear assembly 100 is the opposed worm tooth system 140 on input shaft 120 combined with the meshed interface in spur gears between first radial pinion 106 and second radial pinion 206. The configuration of the present disclosure allows to keep the forces within the worm gearing up to 50% of the required torque.

Figure 4:
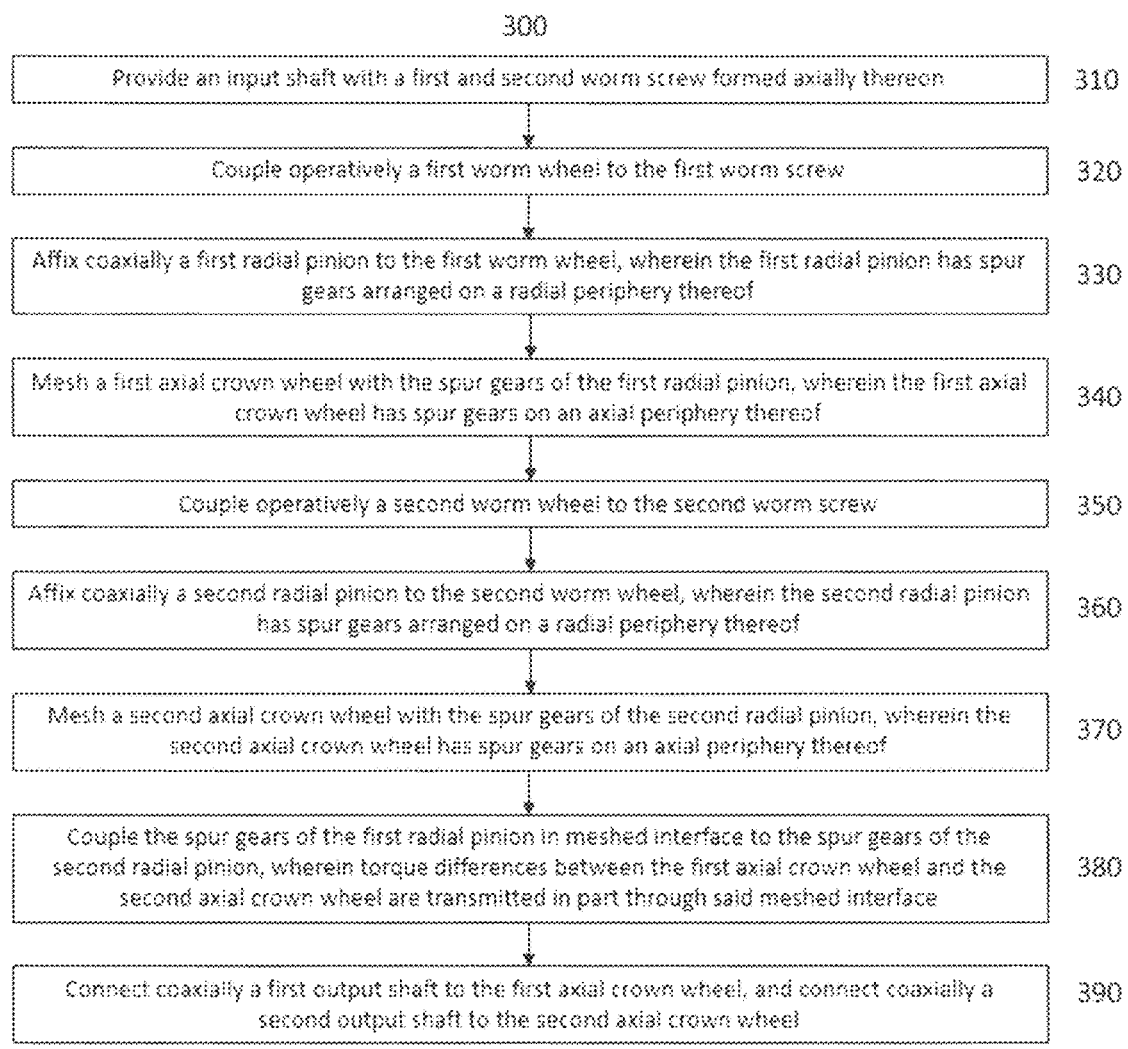
FIG. 4 shows a method for distributing torque in the worm gear assembly in accordance with an aspect of the disclosure.

FIG. 4 shows a diagram illustrating a method 300 for distributing torque in worm gear assembly 100 in accordance with various embodiments. Details of the various processes may be described above.

As shown in FIG. 4, the method 300 may include providing an input shaft with a first and second worm screw formed axially thereon (310), coupling operatively a first worm wheel to the first worm screw (320), affixing coaxially a first radial pinion to the first worm wheel, wherein the first radial pinion has spur gears arranged on a radial periphery thereof (330), meshing a first axial crown wheel with the spur gears of the first radial pinion, wherein the first axial crown wheel has crown gears on an axial periphery thereof (340), coupling operatively a second worm wheel to the second worm screw (350), affixing coaxially a second radial pinion to the second worm wheel, wherein the second radial pinion has spur gears arranged on a radial periphery thereof (360), meshing a second axial crown wheel with the spur gears of the second radial pinion, wherein the second axial crown wheel has crown gears on an axial periphery thereof (370), coupling the spur gears of the first radial pinion in meshed interface to the spur gears of the second radial pinion, wherein torque differences between the first axial crown wheel and the second axial crown wheel are transmitted in part through said meshed interface (380).

The method may further include connecting coaxially a first output shaft to the first axial crown wheel, and connecting coaxially a second output shaft to the second axial crown wheel (390).

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A worm gear assembly comprising:
   an input shaft having a first and second worm screw formed axially thereon;
   a first torque transfer unit comprising:
     a first worm wheel operatively coupled to the first worm screw,
     a first radial pinion coaxially affixed to the first worm wheel, and
     a first axial crown wheel operatively coupled to the first radial pinion,
   a second torque transfer unit comprising:
     a second worm wheel operatively coupled to the second worm screw,
     a second radial pinion coaxially affixed to the second worm wheel, and
     a second axial crown wheel operatively coupled to the second radial pinion,
   wherein the first radial pinion is in meshed interface with the second radial pinion, and wherein torque differences between the first axial crown wheel and the second axial crown wheel are transmitted at least in part through said meshed interface.

2. The worm gear assembly of claim 1, wherein
the first radial pinion has spur gears arranged on a radial periphery thereof, and
the first axial crown wheel has crown gears on an axial periphery thereof in mesh with the spur gears of the first radial pinion.

3. The worm gear assembly of claim 1, wherein
the second radial pinion has spur gears arranged on a radial periphery thereof, and the second axial crown wheel has crown gears on an axial periphery thereof in mesh with the spur gears of the second radial pinion.

4. The worm gear assembly of claim 1, further comprising:
a first output shaft connects coaxially to the first axial crown wheel, and a second output shaft connects coaxially to the second axial crown wheel.

5. The worm gear assembly of claim 4, wherein
the input shaft is coaxially connected to a rotary motor.

6. The worm gear assembly of claim 5, wherein
the first and second output shafts are parallel to the motor axis.

7. The worm gear assembly of claim 1, wherein
the worm gear assembly is configured to have an axial double output.

8. The worm gear assembly of claim 1, wherein
the first and second worm screws on the input shaft comprise two opposed screw systems.

9. The worm gear assembly of claim 8, wherein
the two opposed screw systems allow same rotational direction of the first and second axial crown wheels.

10. The worm gear assembly of claim 1, wherein
the first and second worm wheels comprise plastic materials, and the first and second radial pinions comprise plastic materials.

11. The worm gear assembly of claim 1, wherein
the first worm wheel and the first radial pinion comprise a single part.

12. The worm gear assembly of claim 1, wherein
the second worm wheel and the second radial pinion comprise a single part.

13. The worm gear assembly of claim 1, wherein
the worm gear assembly is configured to achieve a low gear noise.

14. A worm gear assembly comprising:
an input shaft having a first and second worm screw formed axially thereon;
a first torque transfer unit comprising:
a first worm wheel operatively coupled to the first worm screw,
a first radial pinion coaxially affixed to the first worm wheel, the first radial pinion having spur gears arranged on a radial periphery thereof,
a first axial crown wheel having crown gears on an axial periphery thereof in mesh with the spur gears of the first radial pinion, and
a second torque transfer unit comprising:
a second worm wheel operatively coupled to the second worm screw,
a second radial pinion coaxially affixed to the second worm wheel, the second radial pinion having spur gears arranged on a radial periphery thereof, and
a second axial crown wheel having crown gears on an axial periphery thereof in mesh with the spur gears of the second radial pinion,
wherein a first output shaft connects coaxially to the first axial crown wheel, and a second output shaft connects coaxially to the second axial crown wheel,
wherein the spur gears of the first radial pinion is in meshed interface with the spur gears of the second radial pinion, and
wherein torque differences between the first output shaft and the second output shaft are transmitted at least in part through said meshed interface.

15. The worm gear assembly of claim 14, wherein
the worm gear assembly is configured to have an axial double output.

16. The worm gear assembly of claim 14, wherein
the first and second worm screws on the input shaft comprise two opposed screw systems.

17. The worm gear assembly of claim 14, wherein
the input shaft is coaxially connected to a rotary motor, and the first and second output shafts are parallel to the motor axis.

18. The worm gear assembly of claim 14, wherein
the worm gear assembly is configured to achieve a low gear noise.

19. A method for distributing torque in a worm gear assembly, the method comprising:
providing an input shaft with a first and second worm screw formed axially thereon;
coupling operatively a first worm wheel to the first worm screw;
affixing coaxially a first radial pinion to the first worm wheel,
wherein the first radial pinion has spur gears arranged on a radial periphery thereof;
meshing a first axial crown wheel with the spur gears of the first radial pinion,
wherein the first axial crown wheel has crown gears on an axial periphery thereof;
coupling operatively a second worm wheel to the second worm screw;
affixing coaxially a second radial pinion to the second worm wheel,
wherein the second radial pinion has spur gears arranged on a radial periphery thereof;
meshing a second axial crown wheel with the spur gears of the second radial crown wheel, wherein the second axial crown wheel has crown gears on an axial periphery thereof; and
coupling the spur gears of the first radial pinion in meshed interface to the spur gears of the second radial pinion,
wherein torque differences between the first axial crown wheel and the second axial crown wheel are transmitted at least in part through said meshed interface.

20. The method of claim 19, further comprising:
connecting coaxially a first output shaft to the first axial crown wheel; and
connecting coaxially a second output shaft to the second axial crown wheel.

* * * * *